United States Patent [19]

Schriner

[11] Patent Number: 5,340,075

[45] Date of Patent: Aug. 23, 1994

[54] ERGONOMIC MOUSE PAD

[75] Inventor: Michael J. Schriner, Bay Village, Ohio

[73] Assignee: Hunt Holdings, Inc., Wilmington, Del.

[21] Appl. No.: 925,729

[22] Filed: Aug. 5, 1992

[51] Int. Cl.$^5$ ............................... A47B 91/00
[52] U.S. Cl. ..................... 248/346; 248/118
[58] Field of Search ............... 248/118, 118.1, 118.3, 248/118.5, 346, 918, 633; 400/715; 340/710; D14/114

[56] References Cited

U.S. PATENT DOCUMENTS

D. 285,203  8/1986  Milroy et al. ............ D14/114
5,056,743 10/1991  Zwar et al. ............... 248/118
5,125,606  6/1992  Cassano et al. .......... 400/715 X
5,131,614  7/1992  Garcia et al. ............ 248/118
5,162,781 11/1992  Cambridge ............... 340/710
5,165,630 11/1992  Connor ................... 248/118.1

Primary Examiner—Ramon O. Ramirez
Attorney, Agent, or Firm—Synnestvedt & Lechner

[57] ABSTRACT

An improved ergonomic mouse pad is disclosed. The mouse pad comprises a four-sided pad constructed from non-skid polymer and having a substantially planar top surface for supporting a computer mouse. Three of the sides of the pad are supported by a vertical sidewall. The planar top surface proximate to the fourth side forms a curved region for facilitating the comfort and ease of use of the hand and wrist of a mouse user.

3 Claims, 4 Drawing Sheets

ERGONOMIC MOUSE PAD

FIELD OF THE INVENTION

The present invention is directed to office devices for increasing hand and wrist comfort. In particular, the present invention is directed to devices for increasing wrist and hand comfort to be used with a computer mouse.

BACKGROUND OF THE INVENTION

A computer mouse is a hand-held device operated on a flat surface which, in cooperation with the appropriate computer hardware and software, permits a computer user to control the movement of a cursor or pointer located on a computer display such as a CRT monitor. Typically, a computer mouse includes a generally mound-like body to be grasped by the user and further includes a control cable connected to the computer. The underside of the mouse includes a roller ball which is connected electronically via the control cable to a cursor or display pointer located on a video display associated with the computer. A typical computer mouse further includes activation buttons. Computer mice may be used with a graphical user interface (GUI) such as Microsoft Windows.

If the user of the mouse desires to move the display pointer or cursor to the upper left of the display, the user orients the mouse on the flat operating surface and pushes the mouse in the direction of the upper left corner of the display while watching the display. The cursor changes its position to correspond to the relative change in the position of the mouse. Thus, the user can guide the cursor to any position on the display by use of the mouse.

The use of a computer mouse greatly increases the speed and ease of inputting commands to a computer, and facilitates much faster data entry than that provided by keyboard usage. While computer mice are capable of achieving high resolutions the work surfaces upon which mice operate can have a profound impact on the resolution and the efficiency of the mouse.

Recently, there has also been enhanced interest in creating computer equipment and device which are ergonomic. "Ergonomic" devices are devices designed to contour to the human body and to facilitate user comfort. The interest in ergonomic devices has been fueled by the increased interest in the medical risks posed by extended computer usage. Among the most serious risks posed by extended keyboard usage is carpal tunnel syndrome, a painful and debilitating condition which affects the user's hands and wrists. Permitting a user's palms or wrists to rest comfortably while using a computer has been found to increase productivity and decrease related physical ailments such as carpal tunnel syndrome.

The prior art has recognized the problem of user comfort and has addressed this problem principally in the area of keyboard operator supports. For example, U.S. Pat. No. 5,050,826 entitled "Body Support Apparatus" discloses a body support apparatus and most particularly an apparatus for supporting the hands, wrists or arm of a keyboard operator. U.S. Pat. Nos. 4,482,063 and 4,481,556 both entitled "Computer Terminal Support and Hand Rest", disclose computer terminal supports and hand rests to be placed in a desk top and interposed between the computer terminal and a computer operator. The computer terminal supports disclosed in both patents provide rests for supporting the hands of the operator both during the use of the computer terminal and during rest intervals.

U.S. Pat. No. 4,545,554 entitled "Wrist Support for Use With an Office Machine Having a Keyboard" similarly discloses a wrist support for use with an office machine having a keyboard and is designed to fit against the front of the keyboard. See also U.S. Pat. No. 4,621,781 entitled "Ergonomic Forearm Rest For Use With Keyboards".

Finally, U.S. Pat. No. 4,973,176 entitled "Appendage Rest" discloses a portable palm, wrist and forearm rest. The device is shown as being applicable for use with a computer mouse. However, the device comprises a separate piece of apparatus separate from the mouse pad or keyboard with which it is used.

Thus, a number of devices to facilitate wrist and hand support and comfort have been developed in the prior art. All however comprise separate apparatus either applied directly to the keyboard or mouse, or which are used in conjunction therewith.

However, there have been no previous efforts which address the problem of facilitating mouse use and comfort which are directed to the shape of the mouse pad itself. Conventional mouse pads typically comprise completely flat pads which require the uncomfortable flexion of the user's wrist and hand. Such pads are also frequently constructed from soft foam materials which may fray and splinter with extended usage.

It would be desirable to provide a mouse pad which is constructed from a non-skid vinyl and which includes a curved region to facilitate wrist comfort while the mouse is used. The curved region would provide an inclined surface to accommodate the user's wrist while the user's hand has access to the mouse. Such a durable non-skid vinyl would not disintegrate after extended use.

SUMMARY OF THE INVENTION

In accordance with the present invention, an improved ergonomic mouse pad is disclosed. The mouse pad is constructed from a non-skid polymer and includes a curved region which facilitates the wrist and hand comfort of the user of the pad. In a preferred embodiment, the pad is constructed from injection molded polyvinyl chloride.

Also, in a preferred embodiment, the mouse pad comprises a substantially flat pad having a polymeric top surface for supporting a computer mouse. The top surface has a curved region of convex curvature for supporting the hand and wrist of a user of the computer mouse.

In yet a more preferred embodiment, the present invention is directed to an improved mouse pad comprising a pad constructed from polyvinyl chloride, said pad comprising a four sided substantially planar top surface supported by three sidewalls, said substantially planer surface supporting a computer mouse. The pad forms a curved region proximate to said fourth side for facilitating the comfort and ease of use of the hand and wrist of a mouse user.

BRIEF DESCRIPTION OF THE DRAWINGS

The present invention is described with reference to a preferred embodiment described in the following detailed description with reference to the Figures appended hereto. It is to be appreciated that other instrumentalities may fulfill the spirit and scope of the present invention and that the true scope of the present invention is to be determined with reference to the claims appended hereto.

DETAILED DESCRIPTION OF THE PREFERRED EMBODIMENT

Figure 1:
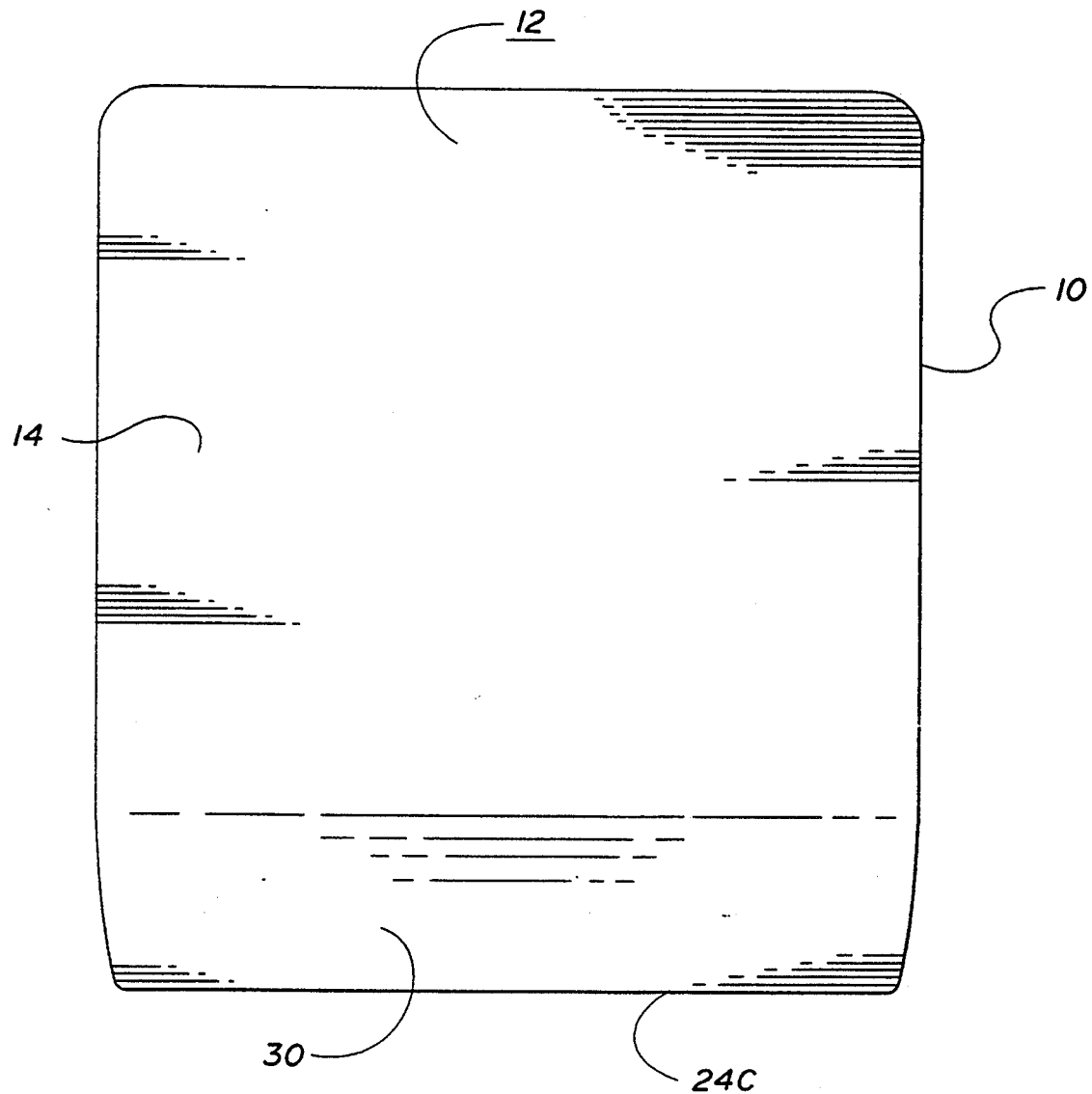
FIG. 1 is an overhead plan view of a mouse pad of the present invention.
Figure 3:
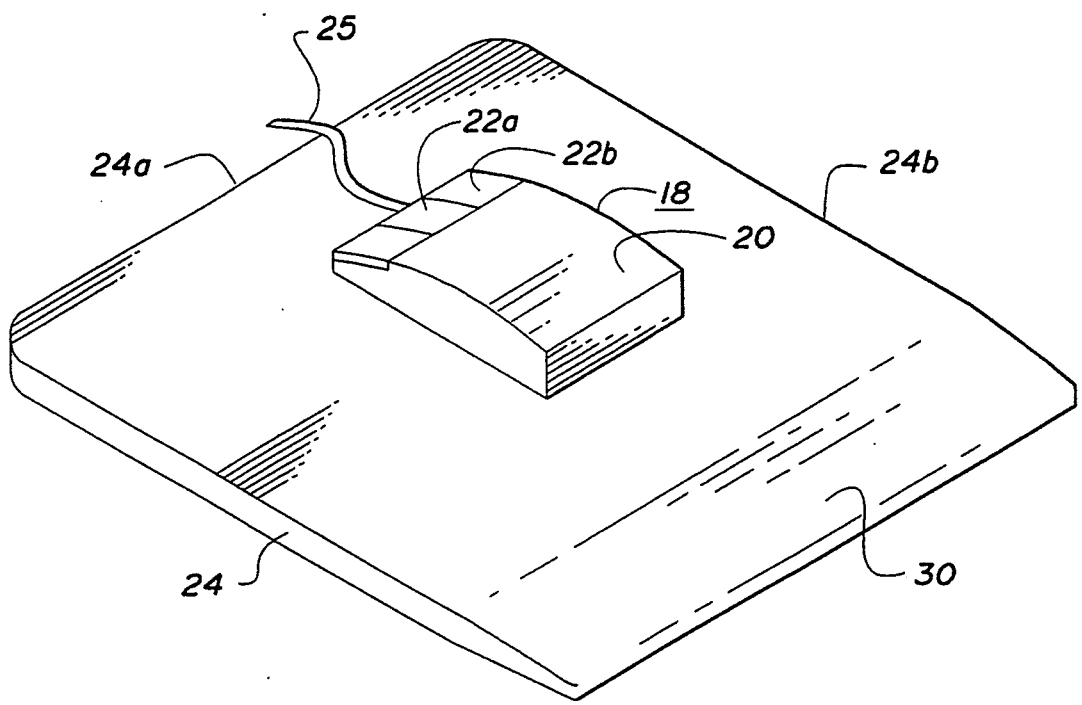
FIG. 3 is an elevated perspective view of the mouse pad of the present invention.

The present invention is described with reference to the enclosed Figures wherein the same numbers are utilized in various of the Figures where applicable. Referring to FIG. 1, an overhead plan view of the ergonomic mouse pad 10 of the present invention is illustrated. The mouse pad 10 in a preferred embodiment comprises a substantially flat pad 12 having a polymeric top surface 14 for supporting a computer mouse 18, as shown in FIG. 3. Mouse 18 is conventional and comprises a mound-shaped body 20 having control buttons 22, 22a, 22b and a control cable 25. Typically, mouse 18 is utilized to control the cursor on a computer display (not shown) and by means of the control buttons 22a, 22b, 22c, to control other computer functions.

In a preferred embodiment, pad 10 is shown as comprising a four sided structure having three substantially vertical sidewalls 24, 24a, 24b proximate to each side, and a fourth smaller wall 24c. It is to be appreciated that pad 10 may have more or fewer than four sides and may form any of a variety of geometric shapes and configurations.

In a more preferred embodiment, the polymeric top surface 14 comprises a non-skid surface and preferably is constructed from a vinyl material such as a polyvinyl chloride (PVC). It is to be appreciated that other non-skid polymeric surfaces may be utilized to construct the mouse pad of the present invention. Top surface 14, preferably constructed from polyvinyl chloride, provides a faster track which does not accumulate dirt, keeps the mouse 18 cleaner during usage, and extends the life of mouse 18. Polyvinyl chloride further resists spills and dirt, and wipes clean instantly. Finally, polyvinyl chloride does not disintegrate after extended usage like foam rubbers.

Figure 2:
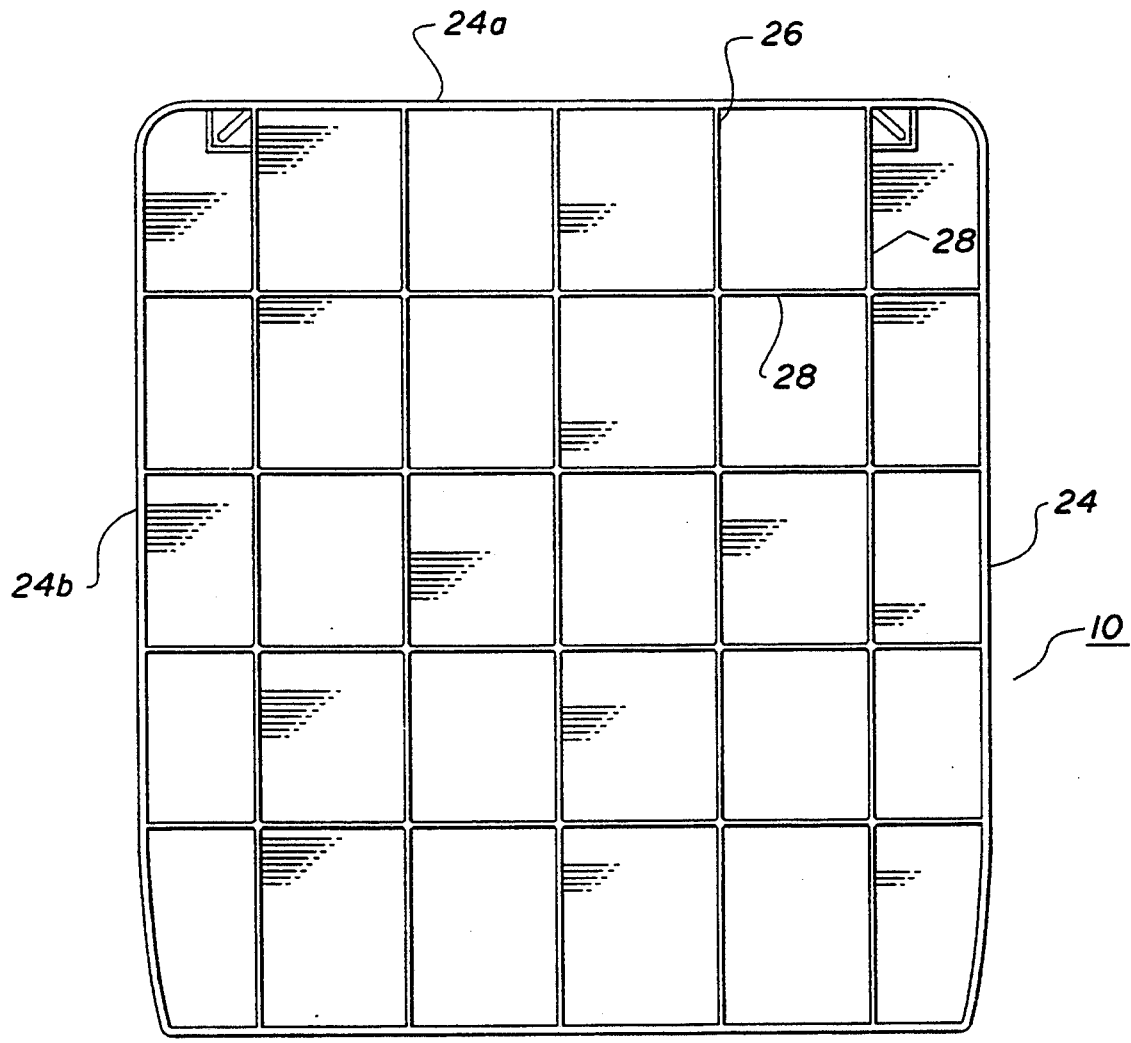
FIG. 2 is an underside plan view of the mouse pad of the present invention.
Figure 4:
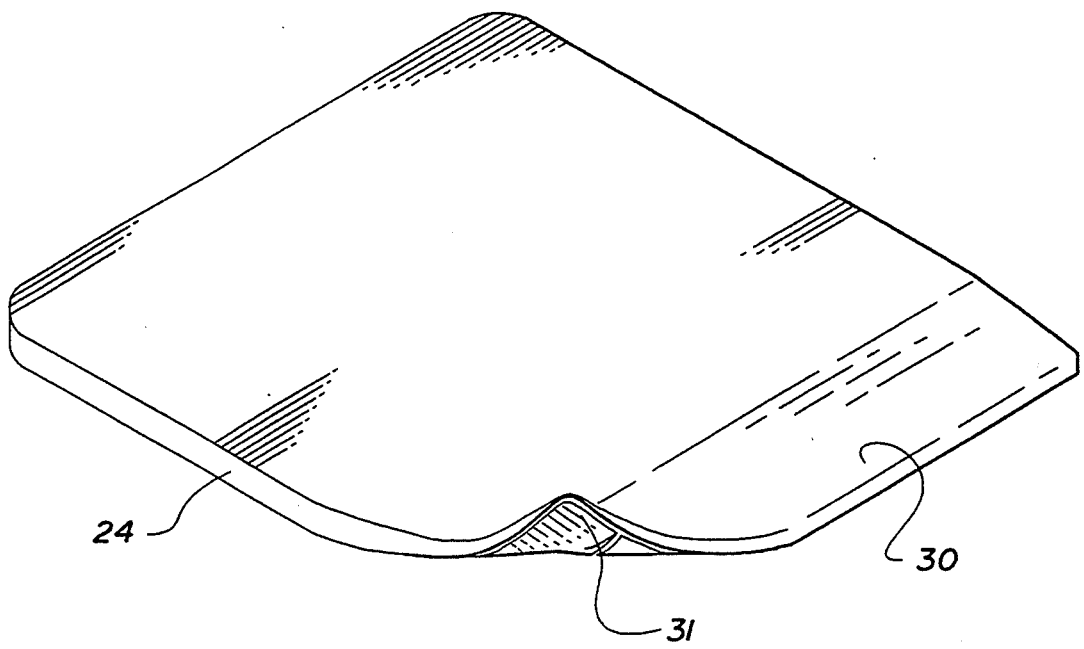
FIG. 4 is the elevated view of FIG. 3 but with one corner of the mouse pad bent upward.
Figure 5:
FIG. 5 is a front elevational view of the mouse pad of the present invention.
Figure 6:
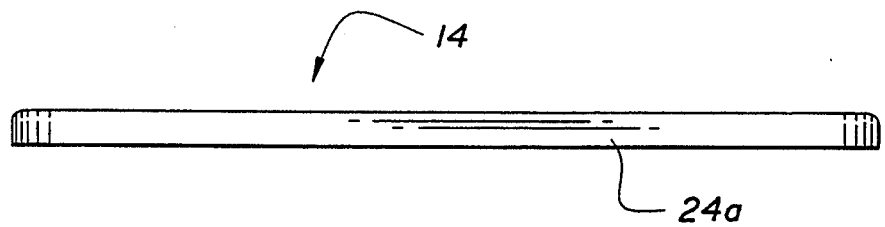
FIG. 6 is a rear elevational view of the mouse pad of the present invention.

The mouse pad 10 of the present invention is preferably injection molded in a single mold. Referring to FIG. 2, the underside of the mouse pad may comprises a support grid 26 comprising rectangular, interlinked walls 28 which provide support for the pad 10 and which are interlocked with the sidewalls 24, 24a, 24b and 24c. Referring to FIG. 4, pad 10, constructed from non-skid vinyl and preferably polyvinyl chloride, is flexible, bendable and pliable as shown at 31.

Figure 7:
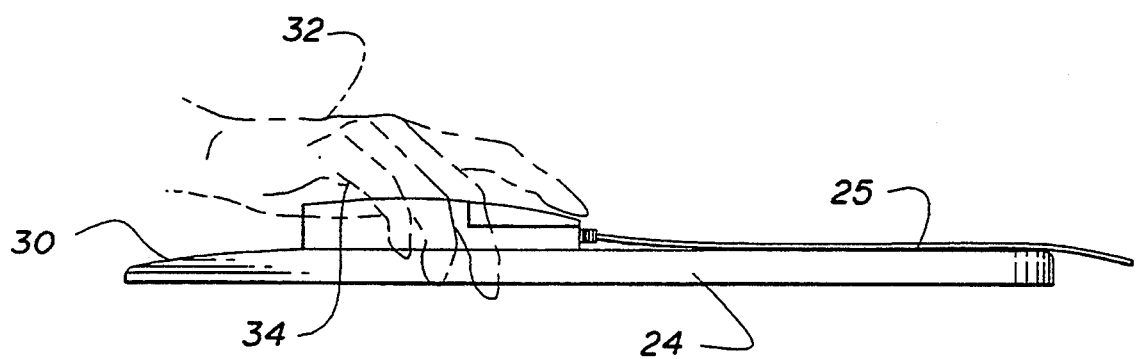
FIG. 7 is a side elevational view of the mouse pad in accordance with the present invention.

Referring now to FIGS. 3 and 7, an important feature of the present invention is the inclusion of beveled or curved region 30 formed on the planar top surface 14 and situated proximate to the fourth side 24c of the pad 10. Beveled or curved surface 30 supports the hand and wrist 32 of a user of said computer mouse. As shown, the region 30 is illustrated as being of convex curvature but may have other curvatures. The beveled or curved front region 30 provides an area of ergonomic wrist and hand support and comfort which facilitates the ease of use of the mouse with the hand of the user. As shown most particularly in FIG. 7, the curved or beveled region 30 creates a smooth transition 34 between the hand of the user 32 and the mound-shaped mouse 18, thus maximizing user comfort.

The mouse pad of the present invention thus provides a pad which facilitates comfort for the Wrist and hand of the user, and which further provides a non-skid polymeric surface for the computer mouse 18. While the present invention has been described with reference to the above described preferred embodiment, it is to be appreciated that other embodiments fulfill the spirit and scope of the present invention and that the true nature and scope of the present invention is to be determined with reference to the claims appended hereto.

What is claimed is:

1. An ergonomic mouse pad comprising:
   a pad having a front edge and a rear edge, and a first substantially flat and horizontal top surface region extending from said rear edge toward said front edge for supporting a computer mouse during its use, and having a second top surface region merging smoothly and sloping downwardly from said first top surface region to said front edge of said pad to provide support and comfort for the hand and wrist of a user of the mouse.

2. The mouse pad of claim 1, wherein said second top surface region is convex upward.

3. The mouse pad of claim 1, wherein said first top surface is of a non-slid polymeric material.

* * * * *